United States Patent

Naber

[15] 3,647,535

[45] Mar. 7, 1972

[54] METHOD OF CONTROLLABLY OXIDIZING A SILICON WAFER

[72] Inventor: Charles T. Naber, Centerville, Ohio

[73] Assignee: The National Cash Register Company, Dayton, Ohio

[22] Filed: Oct. 27, 1969

[21] Appl. No.: 869,699

[52] U.S. Cl. ....................117/212, 117/201, 117/106 A

[51] Int. Cl. ....................H01l 7/60

[58] Field of Search ....................117/201, 118, 229, 106 A, 215, 117/212

[56] References Cited

UNITED STATES PATENTS

| | | | |
|---|---|---|---|
| 3,426,422 | 2/1969 | Deal | 29/571 |
| 3,158,505 | 11/1964 | Sandor | 117/215 |
| 3,460,003 | 8/1969 | Hampikian | 117/212 X |
| 3,385,729 | 5/1968 | Larchian | 117/215 X |

*Primary Examiner*—Ralph S. Kendall
*Attorney*—Louis A. Kline, John J. Callahan and John P. Tarlano

[57] ABSTRACT

The present invention relates to a method of growing an optimum-thickness silicon dioxide layer for a nonvolatile metal-silicon nitride-silicon oxide-silicon field effect memory transistor near atmospheric pressure in a controllable manner. A silicon wafer, having source and drain regions therein, is placed within an epitaxial reactor through which an inert gas is then made to flow at a rate of 30 liters/minute. The silicon wafer is heated to 1,000° centigrade, and a 1.2-liter flow of oxygen is introduced into said epitaxial reactor for 15 minutes. The flow of oxygen gas is dispersed throughout the flow of the inert gas. The silicon crystal is slowly oxidized to form a 52.5-angstrom thick silicon dioxide layer thereon. When the selected time of oxidation has passed, the small flow of the oxygen into the epitaxial reactor is stopped. The total oxygen-inert flowing gas pressure in the epitaxial reactor is slightly above atmospheric pressure. A precise regulation of the thickness of a silicon dioxide layer grown on a silicon crystal is achieved by regulating the flow rate of oxygen relative to the flow rate of inert gas and regulating the oxidation temperature. The method of the present invention allows one to produce a 52.5-angstrom thick silicon dioxide layer on a silicon crystal. The 52.5-angstrom thick silicon dioxide layer is then covered with a 1,000-angstrom thick silicon nitride layer by chemical decomposition in the epitaxial reactor. A metal electrode in the silicon nitride layer and metal electrodes on the uncovered source and drain regions complete an MNOS field effect memory transistor which has very good switching characteristics.

7 Claims, 3 Drawing Figures

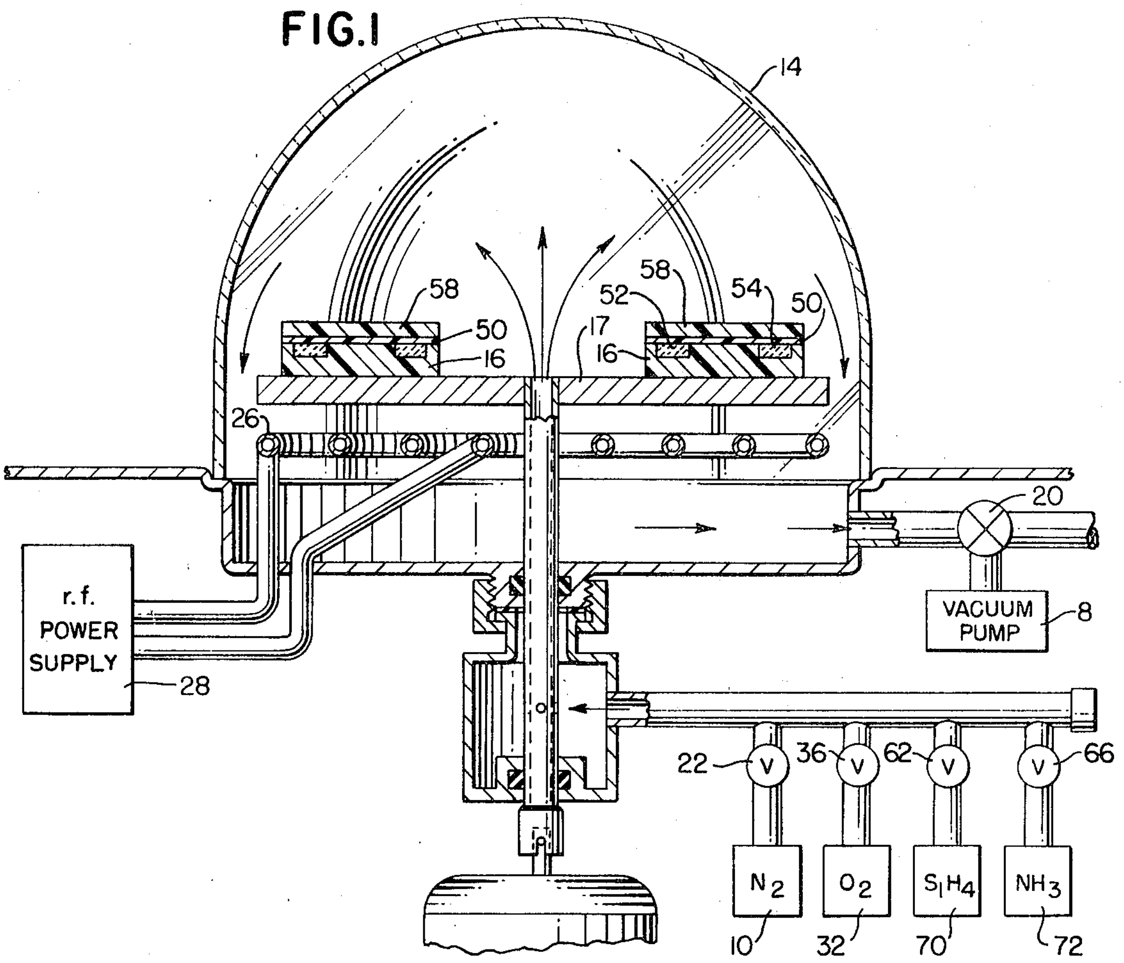
FIG. 3
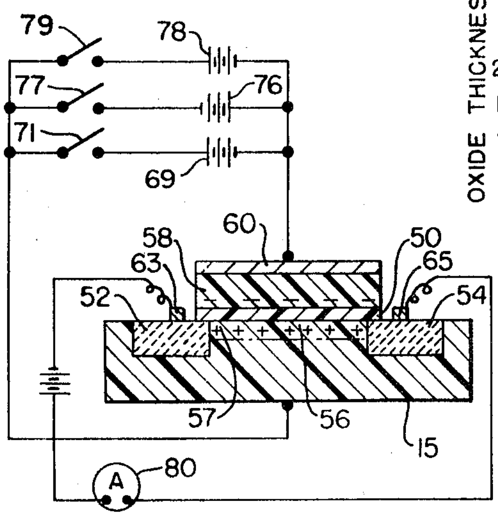
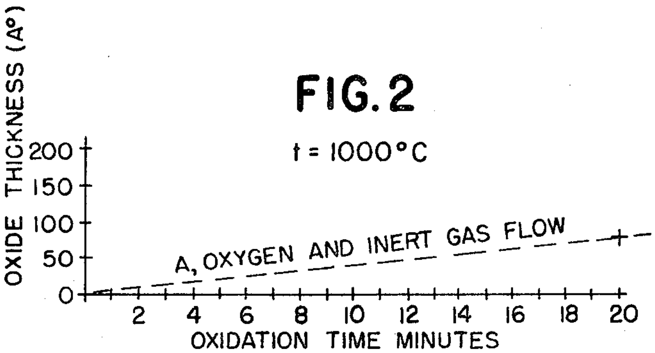
INVENTOR
CHARLES T. NABER
BY Louis A Kline
John J. Callahan
John P. Tarlano
HIS ATTORNEYS

METHOD OF CONTROLLABLY OXIDIZING A SILICON WAFER

BACKGROUND OF THE INVENTION

United States Pat. No. 3,426,422, which issued Feb. 11, 1969, on the application of Bruce E. Deal, discloses a method of oxidizing a silicon crystal. A silicon crystal is heated to a temperature of approximately 1,000° centigrade. Oxygen gas or oxygen gas and water vapor are passed over the silicon for approximately 60 minutes to oxidize said silicon crystal. Deal does not use a flowing inert gas to disperse a flowing oxygen gas around a silicon wafer, thus allowing a slow rate of oxidation of a silicon wafer. The method of the present invention uses a flowing inert gas to disperse a flowing oxygen gas around a silicon wafer. The oxidation of a silicon wafer may thus be carried out at a slower rate, without reducing oxidation temperature, so as to allow the precise growing of a very thin silicon dioxide layer on a silicon wafer.

DESCRIPTION OF THE DRAWINGS

FIG. 1 is a sectional view, partially diagrammatical, of the apparatus for carrying out the method of the present invention.

FIG. 2 is a plot of the growth rate of a silicon dioxide layer produced by the method of the present invention.

FIG. 3 is a sectional view, partly diagrammatical, of a nonvolatile field effect transistor formed by use of the method of the present invention.

DESCRIPTION OF THE PREFERRED EMBODIMENT

As shown in FIG. 1, silicon crystals 16 are placed on a carbon susceptor 17 within an epitaxial reactor 14. The epitaxial reactor 14 is sequentially evacuated and flushed for 2 minutes by the use of nitrogen gas flowing at a rate of 30 liters per minute from a nitrogen gas container 10 and by means of a vacuum pump 8. Flushing with nitrogen gas removes all oxidation gases from the epitaxial reactor 14. This flushing is controlled by an entrance valve 22 and an exit valve 20, which can be connected to the vacuum pump 8 or to the atmosphere. The silicon crystal 16, on the rotating susceptor 17, is heated to approximately 1,000° centigrade, by means of radiofrequency induction coils 26 mounted within the epitaxial reactor 14, directly below the susceptor 17. The induction coils are energized by a radiofrequency power supply 28. The pressure within said reactor 14 is now maintained at slightly above atmospheric pressure on the epitaxial reactor side of the valve 20, which is now vented to the atmosphere.

Oxygen from an oxygen container 32 is then passed through a control valve 36 into the epitaxial reactor 14 at a flow rate of 1.2 liters per minute. The flowing rate of oxygen within the epitaxial reactor 14, therefore, is 3.84 percent of the total flowing gas rate. The silicon crystal 16 has a silicon oxide layer 50 grown thereon.

When the diluted flowing oxygen gas, in the flowing nitrogen gas, is allowed to oxidize a silicon crystal similar to the silicon crystal 16 for 20 minutes, a measured approximately 70-angstrom thick silicon dioxide layer is thereby grown upon the former silicon crystal. This 70-angstrom value is plotted in FIG. 2 and is used to help plot the line A, assuming linear silicon oxide growth with oxidation time. The silicon crystal 16 is allowed to oxidize for only 15 minutes. FIG. 2 predicts that a 52.5-angstrom thick silicon oxide layer 50 is grown on the silicon crystal 16. In the preferred embodiment of the present invention, the silicon crystal 16 should be oxidized for 15 minutes under the above conditions. The valve 36 is then turned off, and the flow of nitrogen is continued until all of the oxygen is swept out of the reactor 14. The silicon crystal 16 can be cooled and removed from the epitaxial reactor 14. However, in the present embodiment, a silicon nitride layer 58 is formed before cooling.

A 1,000-angstrom thick silicon nitride layer 58 is formed at 1,000° centigrade upon the silicon oxide layer 50 in the epitaxial reactor 14. Silane is passed through a valve 62 from a container 70, and ammonia is passed through a valve 66 from a container 72, for approximately 2 minutes. Due to the relatively short periods of both the oxidation and the silicon nitride deposition reaction, a P-type source region 52 and a P-type drain region 54, previously formed in the N-type silicon crystal 16, are not substantially changed in their acceptor concentration profiles. The silicon nitride-silicon oxide coated silicon crystal 16 is then cooled and removed from the epitaxial reactor 14.

As shown in FIG. 3, the silicon oxide layer 50 and the silicon nitride layer 58 are selectively etched, so as only to extend from the edge of the P-type source region 52, across a middle N-type region 56, to the edge of the P-type drain region 54.

The partially processed silicon crystal 16 is fabricated into a nonvolatile metal-silicon nitride-silicon oxide-silicon (MNOS) field effect memory transistor 15, as shown in FIG. 3. A gate electrode 60, such as an aluminum gate electrode, is deposited by vacuum evaporation and etching delineation onto the silicon nitride layer 58. A source electrode 63 and a drain electrode 65 are attached to the P-type source region 52 and the P-type drain region 54, also by vacuum evaporation and etching delineation. A metal-nitride-oxide-silicon (MNOS) field effect memory transistor 15 is thereby produced. Due to the slow formation of the thin silicon oxide layer 50 by thermal oxidation, electron traps are not created at the interface between the silicon oxide layer 50 and the N-type region 56 of the MNOS field effect memory transistor 15. The silicon oxide layer 50 therefore aids in producing an MNOS field effect memory transistor 15 which exhibits small drift during its operation. That is, the method of the present invention aids in producing a thin silicon oxide layer 50, upon a silicon crystal 16, in such a way as to retard the formation of traps within the silicon oxide layer 50 of the MNOS field effect memory transistor 15.

An MNOS field effect memory transistor 15 whose silicon dioxide layer-silicon nitride layer combination is produced by the method of the present invention has even less operational drift, due to the ability to keep impurities away from the interface of the silicon oxide layer 50 and the silicon nitride layer 58.

The MNOS field effect memory transistor 15, which has a 52.2-angstrom thick silicon oxide layer 50 therein, will not conduct current between the source electrode 63 and the drain electrode 65 when a probe voltage of −4 volts from a probe voltage source 69 is placed on the gate electrode 60 by a switch 71. The device 15 is said to be in the "zero" state.

A positive switching voltage of +40 volts, from a switching voltage source 76, is then placed on the gate electrode 60 for 1 microsecond, by a switch 77. The MNOS field effect memory transistor 15 then will conduct current between the source electrode 63 and the drain electrode 65 when a probe voltage of −4 volts is again placed on the gate electrode 60 by the switch 71. The device 15 is said to be in the "one" state. The device 15 is switched back to the "zero" state by putting a minus switching voltage of −50 volts on the gate electrode 60 from a switching voltage source 78 for 10 milliseconds. A −4 volts from the probe voltage source 69 will again not cause a source-drain current to flow between the source electrode 63 and the drain electrode 65 as sensed by a meter 80. The "-zero" threshold voltage of the MNOS field effect transistor 15 is −6 volts, and the "one" threshold voltage is −2 volts. The threshold voltage is the gate voltage at which the MNOS field effect transistor 15 begins to conduct a source-drain current between the source electrode 63 and the drain electrode 65.

An MNOS field effect memory transistor which has a 70-angstrom thick silicon dioxide layer, which was thermally grown for 20 minutes, has a high positive switching voltage of +80 volts for 1 microsecond, for a switch from a −6 volts zero threshold voltage to a −2 volts one voltage. It also has a high negative switching voltage of −100 volts from 1 microsecond for a switch from a −2 volts one threshold voltage to −6 volts zero threshold voltage.

It is preferred that an MNOS field effect transistor therefore have a silicon dioxide insulator layer of a thickness of 52.2 angstroms or less. Such a device has two stable states and can be switched between its stable states with a relatively low value of switching voltage, for a short period of time.

When a +40-volt switching voltage is placed on the gate electrode 60 by momentarily closing the switch 77, electrons in the N-type region 56 are attracted through the thin silicon oxide layer 50 and are trapped within the silicon nitride layer 58. The trapped electrons in the silicon nitride layer 58 partially deplete the N-type region 56 even though the switch 77 is opened. When a −4 volts is placed on the gate electrode 60 by closing the switch 71, the region 56 is further depleted of electrons to form a thin P-type channel region 57 in the N-type region 56, just below the silicon oxide insulator layer 50 between the P-type regions 52 and 54. The P-type channel region 57 then exists between the source electrode 63 and the drain electrode 65. Electrons can then flow through said P-type channel region 57 from the source electrode 63 to the drain electrode 65. The switch 71 is then opened to stop the source-drain current flow through the meter 80.

When a negative 50 volts is applied to the gate electrode 60 by momentarily closing a switch 79, the trapped electrons in the silicon nitride layer 58 are repulsed through the thin silicon oxide insulator layer 50 back into the N-type region 56.

When a −4 volts is then placed on the gate electrode 60 by closing the switch 71, not enough negative voltage is concentrated on the N-type region 56 to repulse electrons to form a thin P-type channel region 57 in the N-type region 56 just below the silicon oxide insulator layer. Since no P-type channel is formed between the P-type region 52 and the P-type region 54, no current flows between the source electrode 63 and the drain electrode 65.

It is preferred that the silicon oxide insulator layer 50 be thin enough so that the electrons can tunnel therethrough into or out of said silicon nitride layer 58 under the action of a switching voltage from the switching voltage source 76 or 78, yet thick enough so that electrons will remain trapped in said silicon nitride insulator layer 58 with no switching voltage applied. The thickness for said silicon oxide insulator layer 50 should be 52.5 angstroms or less.

What is claimed is:

1. A method of controllably growing a thin silicon oxide layer on a silicon wafer, comprising:

a. heating said silicon wafer in an oxidation container to a selected oxidation temperature, b. simultaneously passing a mixture of an oxidation gas at a first selected flow rate and an inert gas at a second flow rate selected in relation to said first flow rate, through said oxidation container, to slowly oxidize said silicon wafer over a selected period of time in order to form a thin silicon oxide layer, of a desired small thickness, on said silicon wafer; and c. stopping the flow of said oxidation gas after said selected period of time while continuing the flow of said inert gas.

2. A method of controllably growing an oxide layer of a desired small thickness upon a silicon wafer, comprising:

a. passing an inert gas through an oxidation container and over said silicon wafer to flush oxygen from said oxidation container;

b. heating said silicon wafer in said flushed oxygen-free container to a selected temperature;

c. simultaneously passing a mixture of an oxidizing gas at a first selected flow rate and an inert gas at a second flow rate selected in relation to said first flow rate, through said oxidation container and over said silicon wafer, for a selected period of time, so as to slowly grow an oxide layer of a desired small thickness on said silicon wafer; and d. stopping the flow of said oxidizing gas after said selected period of time while continuing the flow of said inert gas.

3. A method of controllably growing a less than 200-angstrom thick silicon dixode layer upon a silicon wafer, comprising:

a. passing an inert gas through an oxidation container and over said silicon wafer to flush oxygen from said oxidation container;

b. heating said silicon wafer in said flushed oxygen-free container to a temperature of approximately 1,000° centigrade;

c. simultaneously passing a mixture of oxygen gas at a first selected flow rate, and an inert gas at a second flow rate selected in relation to said first flow rate through said oxidation container for a period of approximately 20 minutes, so as to grow a silicon dioxide layer of less than a 200 angstrom thickness on the silicon wafer; and d. stopping the flow of said oxygen gas after said selected period of time while continuing the flow of said inert gas.

4. A method of controllably growing a silicon dioxide layer less than 200 angstroms upon a silicon wafer, comprising a. heating said silicon wafer to a temperature between 700° and 1,100° centigrade within a flushed oxygen-free oxidation container, b. simultaneously passing a mixture of an oxidizing gas at a first flow rate between 0 and 100 liters per minute and an inert gas at a second flow rate between 0 and 100 liters per minute through said flushed oxygen-free oxidation container for a period of time less than 60 minutes; and c. stopping the flow of said oxidizing gas after said selected period of time while continuing the flow of said inert gas.

5. A method of controllably growing an approximately 50-angstrom thick silicon dioxide layer upon a silicon wafer, comprising:

a. heating said silicon wafer in a flushed oxygen-free oxidation container to a temperature of approximately 1,000° centigrade;

b. simultaneously passing a mixture of a flowing oxygen gas and a flowing inert gas through said oxidation container and over said silicon wafer for a concurrent period of approximately 15 minutes, the flow rate of the oxygen gas being approximately 4 percent of the total flow rate of the two flowing gases; and c. stopping the flow of said oxidizing gas after said selected period of time while continuing the flow of said inert gas.

6. The method of claim 5 wherein the oxidation container is an epitaxial reactor one.

7. A method of making a nonvolatile metal-silicon nitride-silicon oxide-silicon field effect memory transistor whose threshold voltage is easily varied by means of a switching voltage, comprising:

a. heating a silicon wafer of a first conductivity type, having source and drain regions of a second conductivity type, in a flushed oxygen-free oxidation container to a temperature of approximately 1,000° centigrade;

b. simultaneously passing flowing oxygen gas, along with flowing inert gas, through said oxidation container and over said silicon wafer for a period of approximately 15 minutes, the oxygen flow rate being approximately 4 percent of the total flow rate of the two flowing gases to controllably grow an approximately 50-angstrom thick silicon dioxide layer on the silicon wafer;

c. stopping the flow of said oxygen gas while continuing the flow of said inert gas;

d. passing silicon-nitride-forming gases through said oxidation container to form an approximately 1,000-angstrom thick silicon nitride layer on the silicon dioxide layer;

e. cooling the silicon wafer;

f. stopping the flow of said inert gas;

g. etching the silicon dioxide and silicon nitride layers off of the source and drain regions; and h. evaporating a gate electrode on the silicon nitride layer, a source electrode on said source region, and a drain electrode on said drain region, to form a nonvolatile metal-silicon nitride-silicon oxide-silicon field effect memory transistor.

* * * * *